(12) United States Patent
Beshke

(10) Patent No.: US 10,223,857 B2
(45) Date of Patent: Mar. 5, 2019

(54) KEYLESS ENTRY WITH VISUAL ROLLING CODE DISPLAY

(75) Inventor: Thomas C. Beshke, Saint Clair Shores, MI (US)

(73) Assignee: METHODE ELECTRONICS, INC., Chicago, IL (US)

( * ) Notice: Subject to any disclaimer, the term of this patent is extended or adjusted under 35 U.S.C. 154(b) by 707 days.

(21) Appl. No.: 12/907,146

(22) Filed: Oct. 19, 2010

(65) Prior Publication Data

US 2011/0090097 A1    Apr. 21, 2011

Related U.S. Application Data

(60) Provisional application No. 61/253,123, filed on Oct. 20, 2009.

(51) Int. Cl.
| | |
|---|---|
| *G07F 7/10* | (2006.01) |
| *B60R 25/23* | (2013.01) |
| *B60R 25/24* | (2013.01) |
| *G06F 3/0488* | (2013.01) |
| *G07C 9/00* | (2006.01) |

(52) U.S. Cl.
CPC ............ *G07F 7/1041* (2013.01); *B60R 25/23* (2013.01); *B60R 25/24* (2013.01); *G06F 3/0488* (2013.01); *G07C 9/0069* (2013.01); *G07C 9/00142* (2013.01)

(58) Field of Classification Search
CPC .............. G07C 9/00142; G07C 9/0069; G07C 9/00698; G07F 7/1041; G07F 7/10; B60R 25/23; B60R 25/24; G06F 21/31; G06F 21/83; G06F 3/0238; G06F 3/0488

USPC ..................................................... 341/20–35
See application file for complete search history.

(56) References Cited

U.S. PATENT DOCUMENTS

| | | | |
|---|---|---|---|
| 5,252,960 A | 10/1993 | Duhame | |
| 5,420,925 A | 5/1995 | Michaels | |
| 5,467,080 A | 11/1995 | Stoll et al. | |
| 6,310,611 B1 | 10/2001 | Caldwell | |
| 6,320,282 B1 | 11/2001 | Caldwell | |
| 6,434,702 B1 * | 8/2002 | Maddalozzo et al. | 726/17 |
| 6,549,194 B1 * | 4/2003 | McIntyre et al. | 345/173 |
| 6,713,897 B2 | 3/2004 | Caldwell | |
| 6,897,390 B2 | 5/2005 | Caldwell et al. | |
| 6,944,018 B2 | 9/2005 | Caldwell | |
| 7,030,513 B2 | 4/2006 | Caldwell | |
| 7,098,414 B2 | 8/2006 | Caldwell | |
| 7,175,304 B2 | 2/2007 | Wadia et al. | |
| 7,218,498 B2 | 5/2007 | Caldwell | |

(Continued)

FOREIGN PATENT DOCUMENTS

WO    WO 2008080228 A1 *    7/2008    ............. G06F 21/36

*Primary Examiner* — An T Nguyen
(74) *Attorney, Agent, or Firm* — Blank Rome LLP (57) ABSTRACT

The present invention relates to a keyless entry system that contains a visual random code generator so that the possible input pattern is different every time a user accesses the system. A keypad device containing an input device and a display are electronically connected to a processor containing the visual random code generator. Positions and associated values are displayed on the input device, such as a touch sensitive screen, allowing the user to enter an access code. The visual random code generator randomizes and controls the input pattern displayed so that the input pattern changes each time the system is accessed.

12 Claims, 7 Drawing Sheets

(56) References Cited

U.S. PATENT DOCUMENTS

| | | |
|---|---|---|
| 7,242,393 B2 | 7/2007 | Caldwell |
| 7,260,438 B2 | 8/2007 | Caldwell et al. |
| 7,361,860 B2 | 4/2008 | Caldwell |
| 2003/0182558 A1* | 9/2003 | Lazzaro ............ G06Q 30/0641 713/183 |
| 2005/0193208 A1* | 9/2005 | Charrette, III ......... G06F 21/31 713/182 |
| 2010/0109920 A1* | 5/2010 | Spradling ............... G06F 21/36 341/23 |

* cited by examiner

KEYLESS ENTRY WITH VISUAL ROLLING CODE DISPLAY

RELATED APPLICATIONS

This application claims the priority of U.S. Provisional Patent Application No. 61/253,123, filed Oct. 20, 2009, the disclosure of which is incorporated herein by reference.

BACKGROUND OF THE INVENTION

Field of the Invention

The present invention relates to keyless entry systems with dynamic and random positioning of input choices to avoid compromising entry codes by observation.

Background of the Related Art

Figure 1:
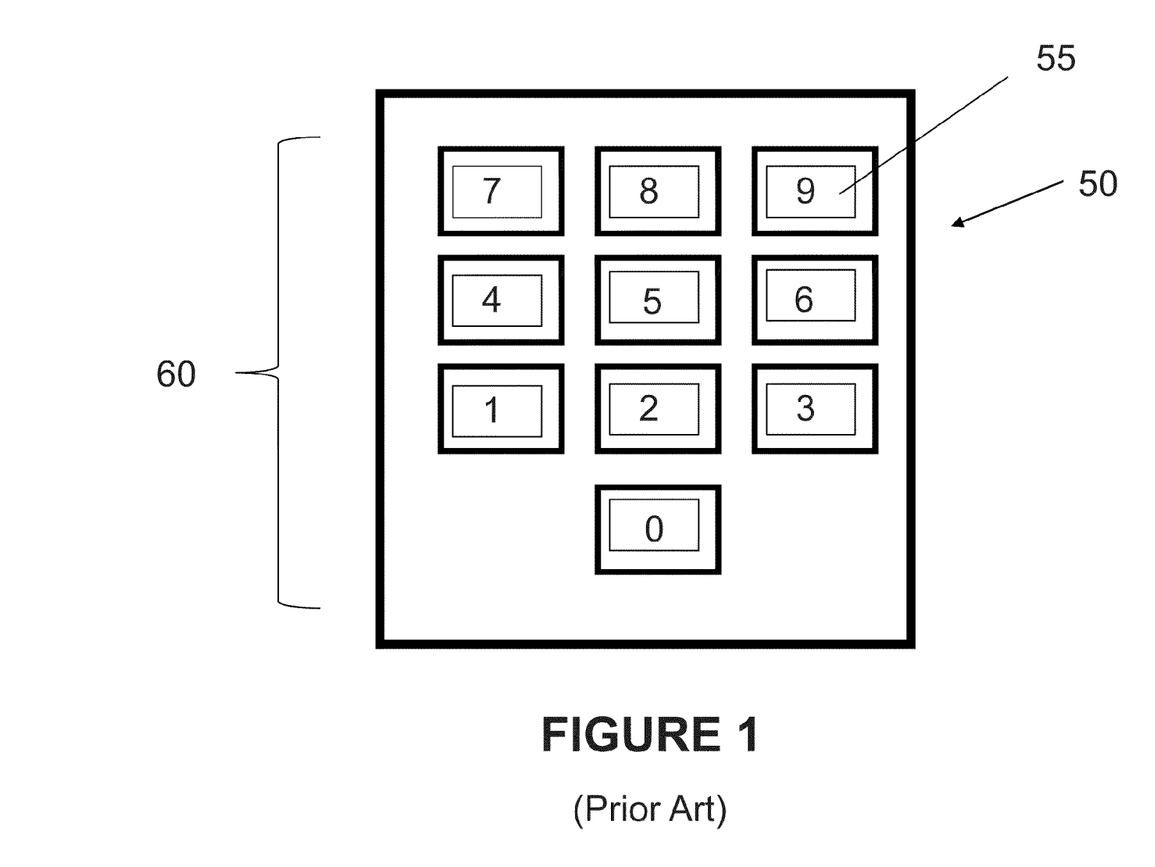
FIG. 1 is a diagram of a keypad with static locations for the input device positions and static values for the numbers assigned to the input device positions.

Automotive keyless entry systems, when first introduced, typically included a numerical keypad located on the exterior door panel of the vehicle. The operator entered an access code, a unique multiple digit code on a static keypad, to automatically unlock or lock the vehicle. One such static keyless entry for an automobile using a key pad is disclosed in U.S. Pat. No. 5,467,080 to Stoll et al., which is incorporated herein by reference. In that system, a control keypad is integrated into the vehicle so that entry of a code on that keypad signals the car to perform a certain function, e.g. opening the door. In that system, however, the positions of the numbers on the keypad are static, i.e., the positions of the keys are always the same. For example, the number 1 is always in the same position; the number 2 is always in the same position; and so forth, as shown in FIG. 1. Further referring to FIG. 1, in a typical alpha numeric keyless entry system 50 the key pad shows the numbers 55 in sequential order. In a static system 50, the pattern that the user enters an access code is always the same. For example, if the entry code value sequence is 5-4-6-2, the entry pattern will always be the same in FIG. 1.

These systems are prone to compromise when another person observes the user pressing the static key positions and values to input the user's protected access code on a static key pad because the numbers are always in the same location, and thus the entry pattern is always the same for a given access code. As a result, the observer can determine the protected access code entry pattern.

Therefore, a need remains for a system whereby the entry pattern of an access code is dynamic (not static and having the same display pattern), so that the same access code entry pattern does not result every time the same access code is entered.

SUMMARY OF THE INVENTION

Accordingly, the present invention relates to an encoding technique that generates a visual random code for use in a keyless entry system that will prevent unwanted entry of the vehicle through the observation and use of the user's access code entry pattern.

The present invention further provides an encoding technique that is adaptable to visually update a keypad of a keyless entry system so that the same pattern is not successively used to enter a given access code.

DETAILED DESCRIPTION OF THE PREFERRED EMBODIMENTS

Figure 2:
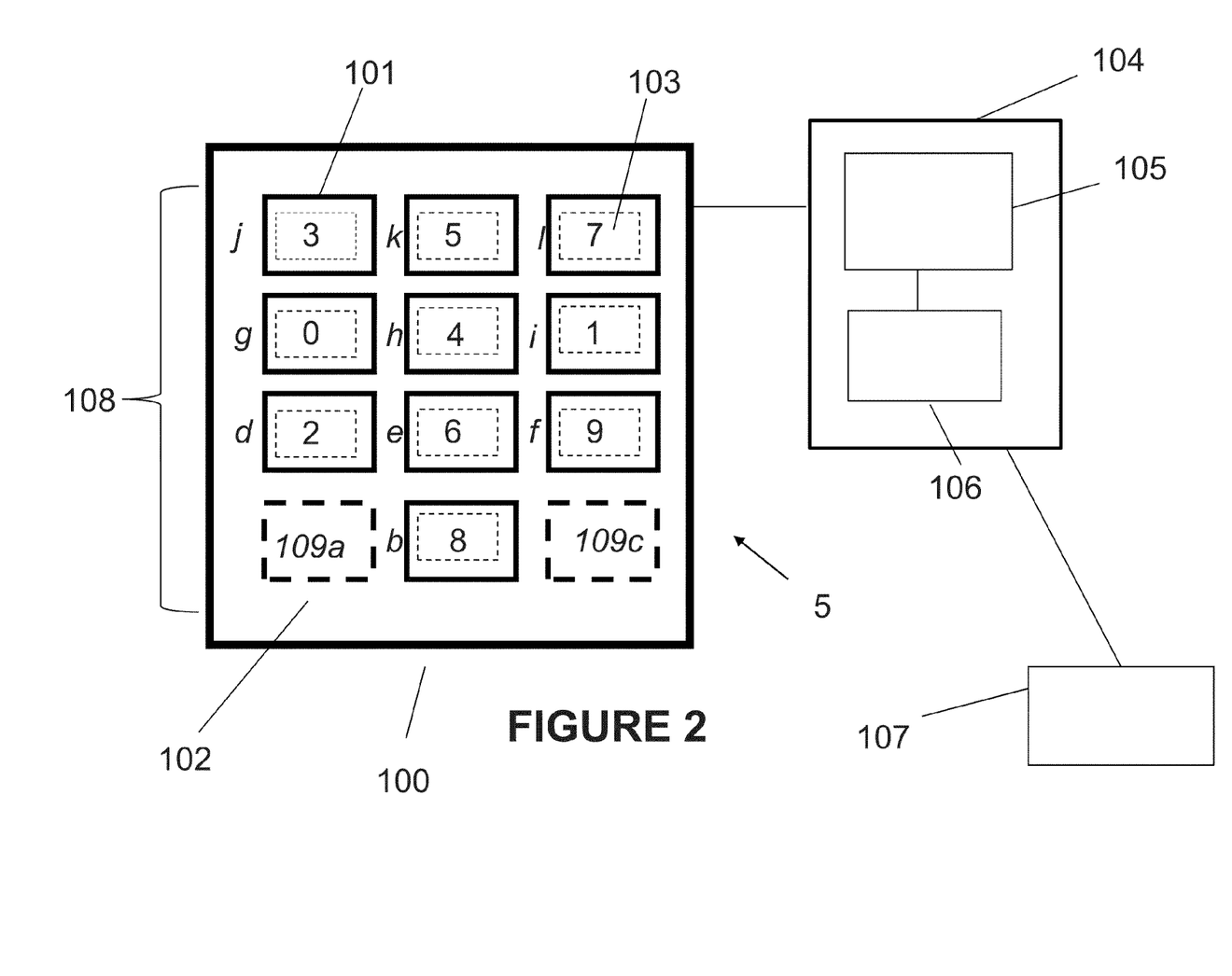
FIG. 2 is a diagram of a keypad system with dynamic and random number values assigned to input device positions.

The system 5 of the present invention contains an input device 100 electronically connected to a processor 104 as shown in FIG. 2. The input device 100 has a plurality of buttons or keys 101, each displaying a digit or value 103. In the embodiment of FIG. 2, the input device 100 is a display 102 which displays the keys 101 and values 103. The input device 100 has a number of positions 109*a*-109*l*. A plurality of buttons or keys 101 having a digit or value 103 are located at the number of positions 109*b*, 109*d*-109*l* and the user enters an access code by sequentially selecting a specific pattern of buttons or keys 101. The input device 100 is preferably a touch-sensitive display 102, though any suitable input device can be used. For instance, the keys 101 can be mechanically-activated buttons with a display.

When a particular button or key 101 is selected by the user, the input device 100 returns the value 103 associated with that key 101 to the processor 104 for processing. The processor 104 knows the positions 109*b*, 109*d*-109*l* of each value 103 displayed on the display 102, and determines the value 103 selected by the user. The processor 104 also generates and stores in memory 106, the position 109*b*, 109*d*-109*l* for each value 103 displayed on the display 102. The processor 104 randomly assigns a digit or value 103 to the positions 109*b*, 109*d*-109*l*. Additionally, the processor 104 can be programmed with a predetermined required access code that, when matched by the input of the user through selecting the correct value 103 sequence, permits the processor 104 to operate a controlled device 107.

The processor 104 contains a visual random code generator 105 for randomly generating the placement of the values 103 displayed at the various positions 109*a*-109*l* on the display 102. The processor 104 may contain and/or be in communication with a memory or storage device 106 to store the required access code and the randomized value and position pattern or patterns. The processor 104 also determines whether the user input access code matches the required access code and notifies the controlled device 107 when access should be granted.

The visual random code generator 105 provides the capability to randomize the location of values 103 on the display 100. The visual random code generator 105 also provides the capability to randomize values 103 of several different value types that are displayed with the positions 109*a*-109*l* such as numbers, letters, colors, pictures, symbols, etc. For example, when the keyless entry system 5 is activated, the visual random code generator 105 generates a random pattern 108 for displaying the values 103 at the positions 109a-109l on the display 102. To facilitate the use of a variety of value types, the visual random code generator 105 could maintain a library of value types in memory 106. Upon entry of the required access code by a system administrator, the processor 104 could determine which value type to display from the library based on the matching of the stored library value types with the required access code value type.

The random code generator 105 generates the random sequence of values 103 assigned to each of the positions 109a-109l as well as the positions 109a-109l at which values 103 are displayed. The random positions can be achieved, for instance, by first identifying the set of values 103 to be randomized. That set of values 103 can then be placed into a positional array, for example, array positions 1 to 10 or 0 to 9. Next, the generator 105 randomly shuffles those array positions. Then, the original array is returned with array positions 1 to 10 or 0 to 9, but with the contents of the array randomized. The generator 105 can also rerun the randomization process if, by the highly unlikely chance, the same array is returned or if the current randomization produces the same final result as the previous randomization. It can also be rerun if the returned array is the same as the standard static keypad configuration of FIG. 1.

Figure 3A:
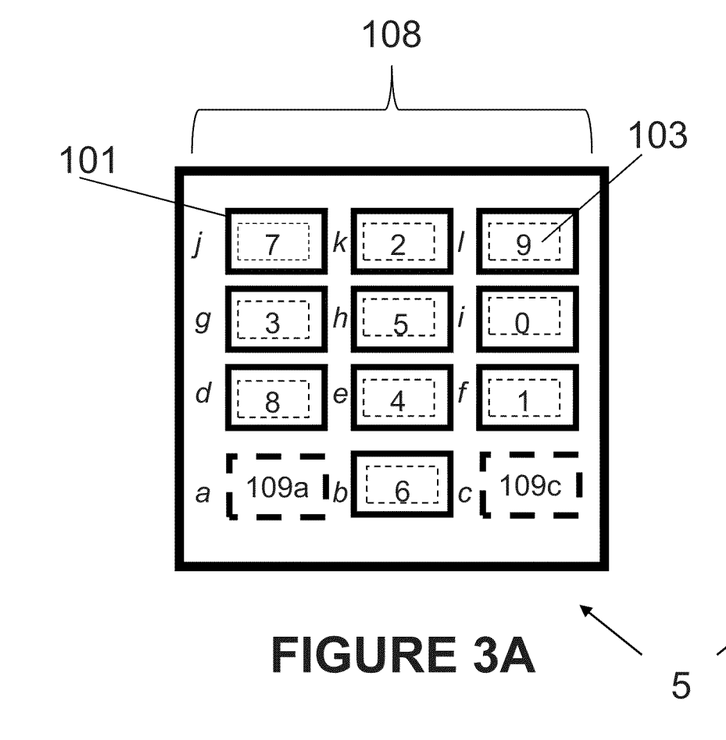
FIG. 3A-3B shows a subset of possible random number values dynamically placed onto static input device positions on a single keypad.
Figure 3B:
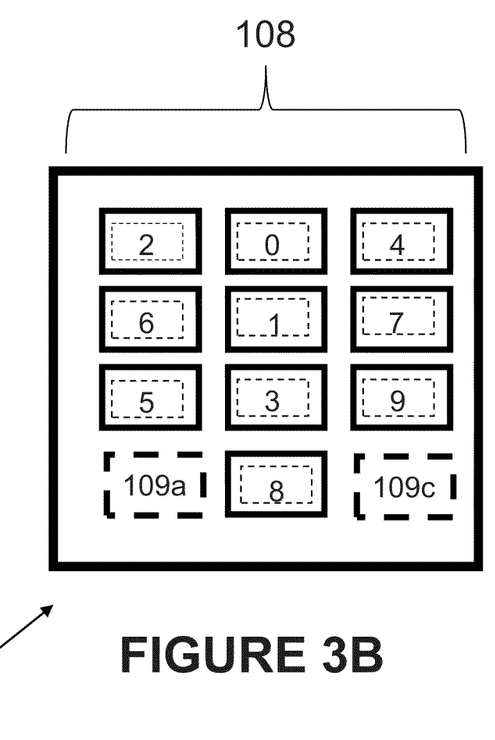

With the visual random code generator 105 of the present invention, the displayed value pattern will be different each time a user activates the system. A randomized displayed value pattern 108 is depicted, for instance, in the keyless entry system 5 of FIG. 2. Here, the visual random code generator 105 causes the display 102 to display the values 103 in a different pattern 108 than that of the static keypad system 50 of FIG. 1. As shown in FIG. 2, the pattern 108 is (8, 2, 6, 9, 0, 4, 1, 3, 5, 7), when taken in the order from the left to right in each row from the bottom row to the top row. Thus, the value "8" is displayed at position 109b, which would normally be value "0" in the fixed system. FIGS. 3A-3B show two system 5 random possibilities for the displayed values 103. By using the visual random code generator 105 of the present invention, the displayed value patterns 108 are different each time the user accesses the system, because the displayed pattern of values 108 (numbers in this case) are different. For example, in FIG. 3A the random pattern is (6, 8, 4, 1, 3, 5, 0, 7, 2, 9), but in FIG. 3B the random pattern is (8, 5, 3, 9, 6, 1, 7, 2, 0, 4).

As a result, an unauthorized person observing the pattern of user input in FIG. 3A cannot successfully use that pattern on FIG. 3B to enter the system. When the observer tries to gain access by mimicking the observed entry pattern on FIG. 3A, the displayed value pattern 108 on FIG. 3B will be different than when he/she observed the previous user's access code entered on the FIG. 3A displayed value pattern 108. Thus, a person observing and memorizing the input pattern cannot use that same pattern to gain access when the display is randomized and changed, such as that shown in FIGS. 3A-3B. Although a numeric code system is discussed above with reference to FIGS. 3A and 3B, the present invention is also compatible with other keyless entry codes using, for example, different colors, pictures, letters, words, symbols, etc.

Figure 4:
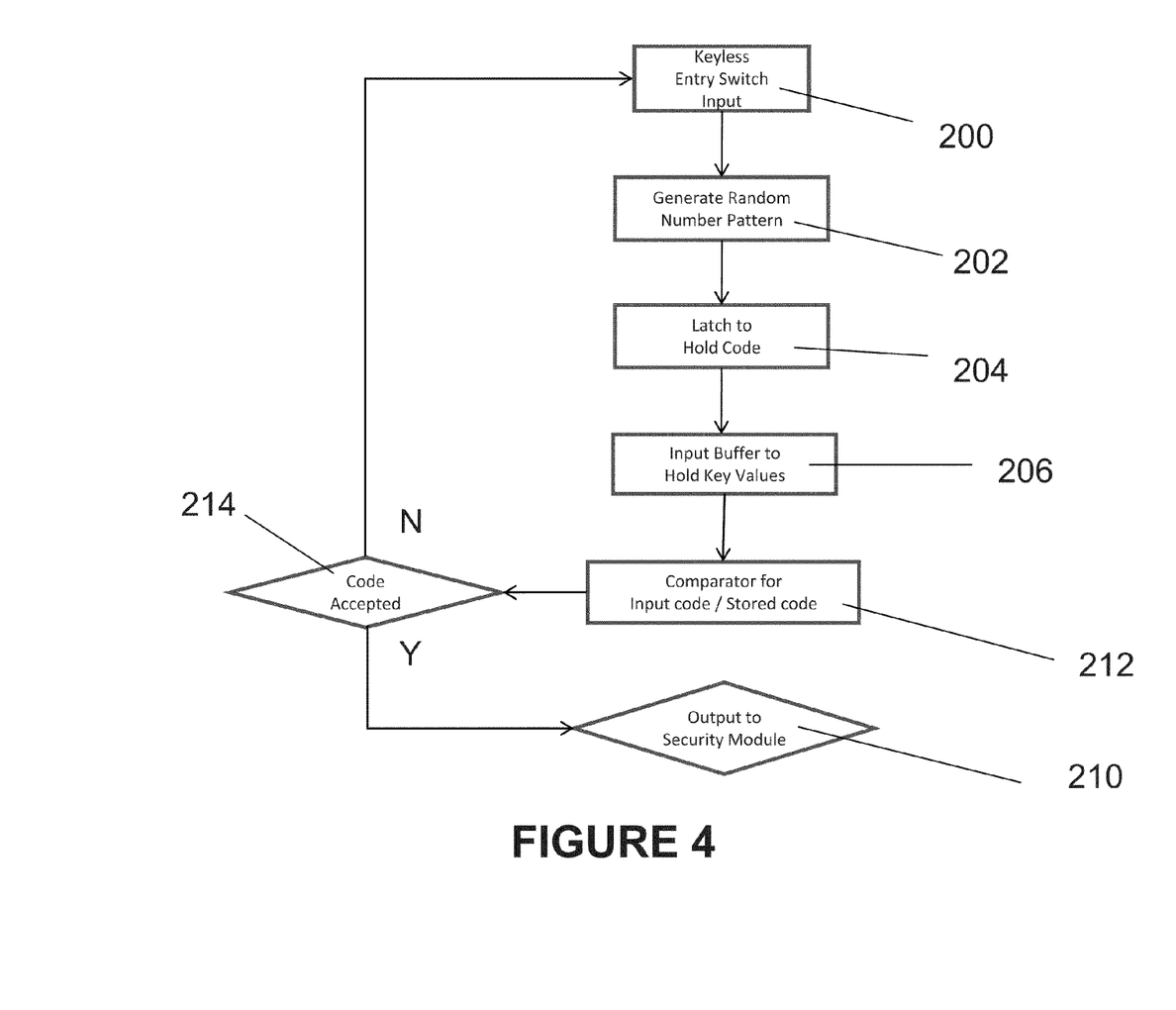
FIG. 4 is a flow diagram showing the operating process of the visual random code entry system in complete access code input mode.

FIG. 4 is a flow chart showing the operating process of the visual rolling code entry system 5. The system 5 is activated by a user (block 200), for example, by the user touching the input device 100, pressing designated button(s), etc. Once activated, the visual random code generator 105 generates a random number pattern 108 that is presented on the display 100 (block 202). The pattern corresponding to the required access code is then held in the memory 106 associated and in communication with the visual random code generator 105 (block 204). The user then enters the entire access code by choosing a sequence of numbers on the display (block 206). The code entered by the user is then compared to the required access code stored in the visual random code generator memory 106 (block 212). If the code entered by the user matches the stored code, the code is accepted (block 214) and access is granted (block 210), for example, by opening a door or allowing entry into the system 5. On the other hand, if the entered code and the stored code do not match, access is denied and the system awaits reactivation by the user (block 200).

The visual rolling code of the present invention is applicable to all keyless entry systems, particularly for any secured applications where access code entry is required. These include, but are not limited to, automobile locks; computer systems, cellular phones, personal digital assistants; automatic teller machines; door entry systems for home, office, garage, etc.; point of sale kiosks; and credit card machines.

In one embodiment, the input device 100 is a touch screen which is sensitive to the touch of a finger or a pointing device. The values 103 displayed on the touch screen are in predetermined positions 109b, 109d-109l on the touch screen, but the values 103 associated with each position 109b, 109d-109l are randomly generated by the visual random code generator 105. For example, if the access code is a sequence of numbers, the touch screen would display numbers 0 to 9 so that the user can enter the access code by touching or pressing on the displayed numbers 103. The user inputs an access code into the processor 104 by touching the positions 109b, 109d-109l on the touch screen that contain the values 103 that correspond to each number of the access code. Each time the user activates the input device 100 to enter a complete sequence of numbers, the values 103 associated with each position 109b, 109d-109l are randomized by the visual random code generator 105, as shown in FIGS. 3A-3B.

FIG. 3A shows a pattern that could randomly be displayed upon activation of the system 5 by a user. Here, the pattern is (6-8-4-1-3-5-0-7-2-9), whereby the number "6" is at position 109b; "8" is at 109d, and so forth. For example, if the access code is 5-2-4-6, the user would first touch the button 101 at position 109h, which is associated with the value "5", followed by touching the button 101 at position 109k, which is associated with the value "2", followed by touching the button 101 at position 109e for the value "4", and finally by touching the position with the value "6" at position 109b. As a final step, the user may have to select an Enter button (not shown) to signal the processor 104 that the user has completed the input.

The processor 104 then compares this user entered sequence of numbers with the stored access code and determine whether a match has occurred. If a match has occurred, the user will have access to the controlled device 107 intended. If the entered number values are incorrect, the user can be either directed by the processor 104 back to the beginning of the process to try again or be locked out of the system, depending on the amount of access attempts allowed. If a next user then activates the system 5, a different random pattern 108 is displayed, such as shown in FIG. 3B. If that person copied the entry pattern of the first user (i.e., by selecting positions 109h, 109k, 109e, 109b), that would result in values 1-0-3-8. Since that is not the correct access code, entry would be denied.

Figure 5A:
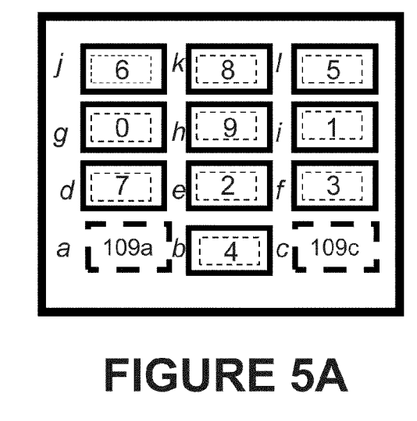
FIG. 5A-5D shows a sequence of four distinct random value groupings on the input device positions of a single keypad.
Figure 5B:
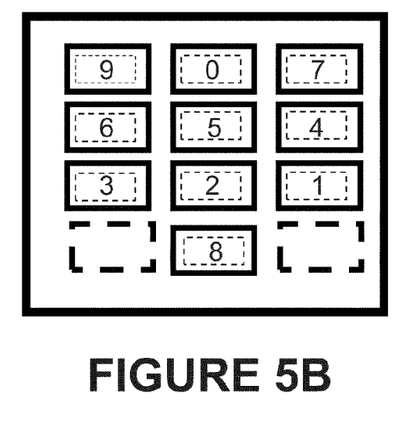
Figure 5C:
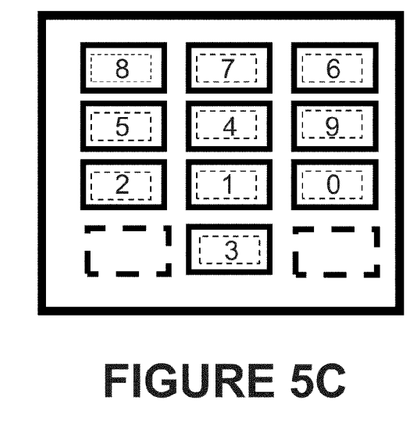
Figure 5D:
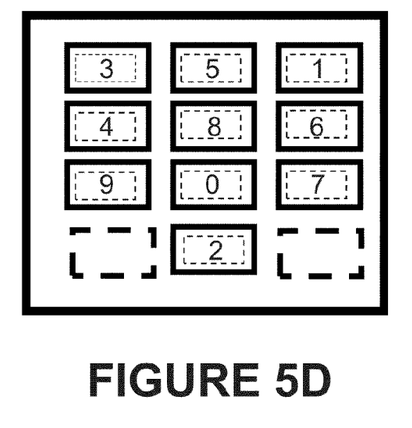
Figure 6:
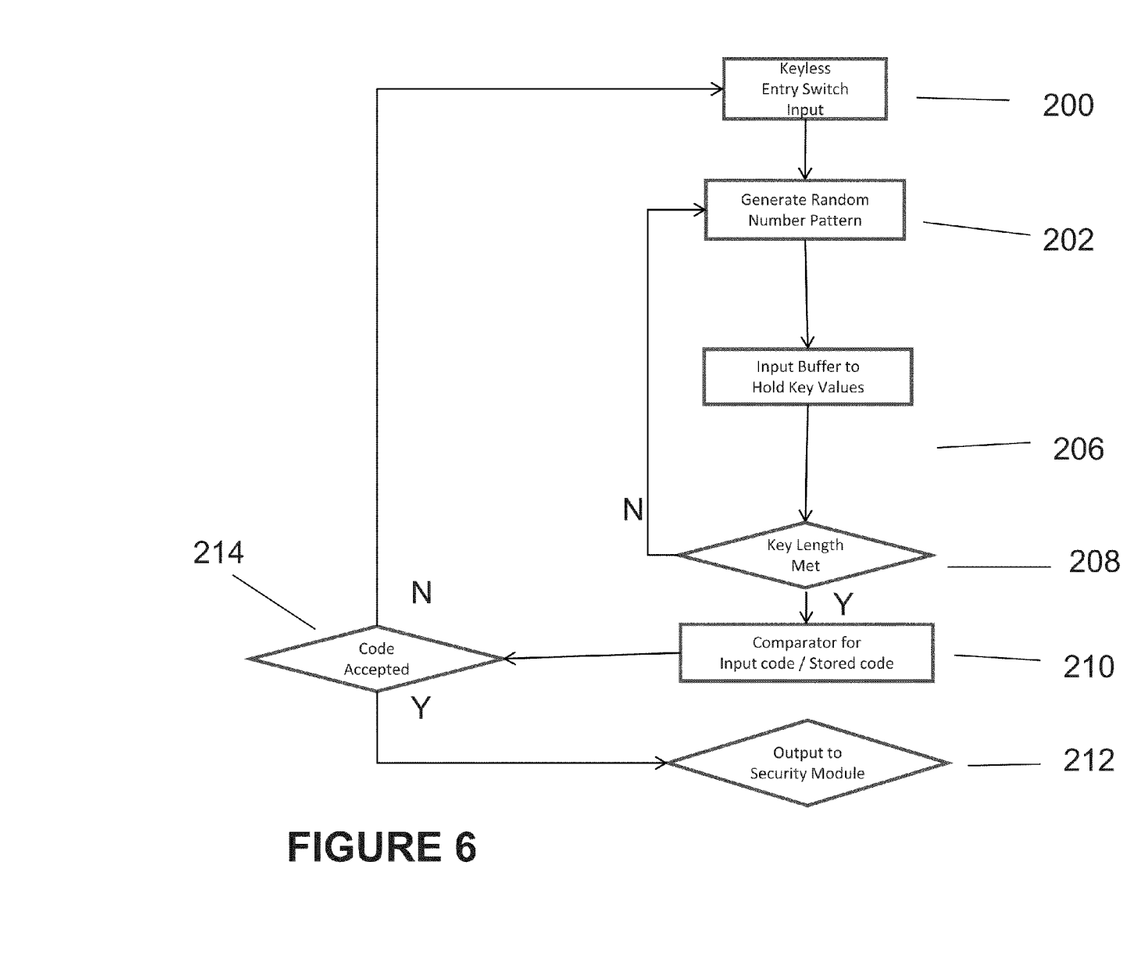
FIG. 6 is a flow diagram showing the operating process of the visual rolling code entry system in single number access code input mode.
Figure 7A:
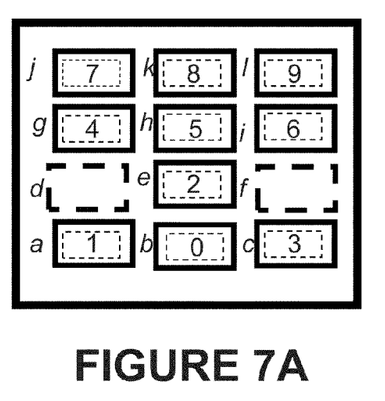
FIG. 7A-7D shows a sequence of four distinct random values and positions groupings on a single keypad in either complete access code or single number access code input mode.
Figure 7B:
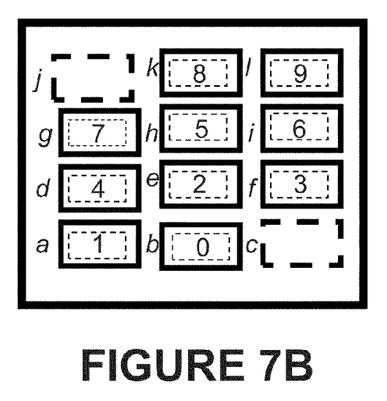
Figure 7C:
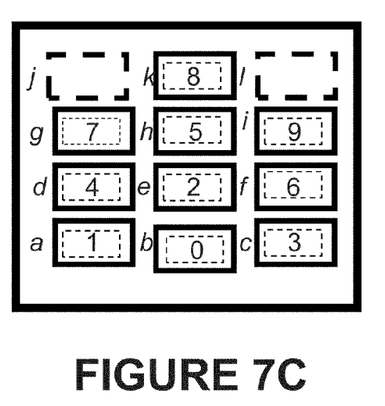
Figure 7D:
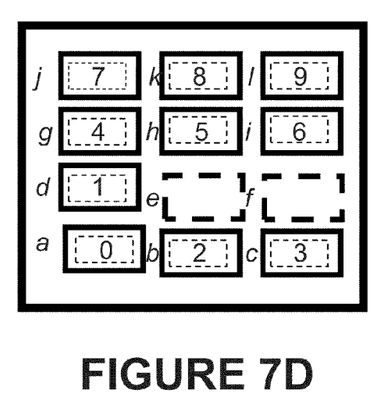

Turning to FIGS. 5-6, another embodiment is shown where the values 103 associated with the positions 109*b*, 109*d*-109*l* are randomized after each time that a key 101 is pressed. The values 103 are displayed on the touch screen in predetermined positions 109*b*, 109*d*-109*l* (block 202). The values 103 associated with each position 109*b*, 109*d*-109*l* are randomly generated by the random code generator 105 (block 202). But instead of waiting for the user to input the entire access code, the values 103 associated with each position 109*b*, 109*d*-109*l* are randomized after each single user input (block 208, 202).

For example, for the access code 5-2-4-6, the input device 100 of FIG. 5A is displayed. The user would then select the position 109*l* showing value "5". The value "5" would be immediately stored by the processor in memory 106 (block 206) and the random code generator 105 would randomize the values 103 associated with the displayed positions 109*b*, 109*d*-109*l* and update the display 102 with the new randomized values (block 202). This changes the positions of the values 103, such as in FIG. 5B where the pattern is now (8, 3, 2, 1, 6, 5, 4, 9, 0, 7). Next, the user would touch the position 109*e* showing value "2." The value "2" would be stored (block 206) and the numbers again randomized on the display 102 as shown in FIG. 5C (block 202). Next, the user would touch the position 109*h* showing the value "4" as shown in FIG. 5C. The value "4" would be stored by the processor 104 in memory 106 (block 206) and the numbers again randomized on the display 102 (block 202). Next, the user would touch the position 109*i* showing the value "6" as shown in FIG. 5D, and the value 6 would be stored by the processor 104 in memory 106 (block 206). The processor 104 would again randomize the numbers and display a new set of values 103. The user would touch enter to prompt the processor 104 to finish the processing of the entered access code and the rest of the processing to determine whether the entered code is accurate, would occur the same as with the first embodiment.

Referring to FIGS. 7A-7D, another embodiment of the invention is shown having positions 109*a*-109*l*. The processor 104 creates the positions 109*a*-109*l* to be displayed and stores the positions 109*a*-109*l* in memory 106. But instead of always displaying each position 109*a*-109*l*, the processor 104 also determines random positions 109*a*-109*l* to be displayed. As shown in FIGS. 7A-7D, there exists enough space on the display 102 to display more keys 101 than values 103. That is, there are 10 spaces needed to display the digits 0 through 9, but at least twelve positions 109*a*-109*l* are available to be displayed. Accordingly, the positions 109*a*-109*l* can be placed onto the display 102 in different configurations as shown. The processor 104 could randomize the twelve positions available and choose to display only the first 10 positions in the array, omitting the display of the last two positions in the array. For added security, the random code generator 105 would also randomize the values 103 to be placed within those 10 displayed positions 109. After the positions 109 and values 103 are displayed the user inputs an access code as previously described in the previous embodiments. Any suitable number of positions 109*a*-109*l* can be provided, though it is preferred there is at least one position 109 for each value 103:

Although the invention has been shown and described as utilizing sequential numbers for the values 103, the numbers need not be sequential. In addition, while the positions 109 are shown in predetermined locations arranged in rows and columns, the positions 109 can be arranged in any suitable configuration. For instance, the positions 109 can be in a circle or be completely random. Still further, while the outlines of the various buttons 101 are displayed in the figures, they need not be. Accordingly, only the values 103 can be shown on the display 102.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. A system comprising:
a controlled device;
an input device associated with the controlled device and having a touch sensitive display for controlling access to the controlled device, wherein the display includes a pre-determined plurality of positions; and
a processor device connected to the input device and having a random code generator and a storage device for locally storing at least:
a library of value types;
a plurality of sets corresponding to each of the value types, each set containing a plurality of values; and
a predetermined required access code comprising a required access code value type,
wherein the processor device is adapted for locally selecting a value type from the library of value types based on the predetermined required access code value type, and, before a first user input to the input device and subsequent to each user input to the input device, for randomizing the plurality of values of the set corresponding to the selected value type, for associating each value from the randomized plurality of values with one of the pre-determined plurality of positions on the display, for randomizing a configuration of the pre-determined plurality of positions on the display to display at each position either one of the randomized values or nothing, and for outputting an instruction to the input device to display the associated randomized values or nothing at each of the randomized positions.

2. The system of claim 1, wherein each of the value types comprise one of numbers, letters, colors, words and symbols.

3. A method comprising the steps of:
providing a controlled device;
providing an input device associated with the controlled device and having a touch sensitive display for controlling access to the controlled device, wherein the display includes a pre-determined plurality of positions thereon;
providing a processor device connected to the input device and having a random code generator, a memory device, and a software, wherein the memory device locally stores a library of value types; a plurality of sets each one corresponding to one of the value types and containing a plurality of values; and a predetermined required access code, the access code comprising a required access code value type;
selecting locally by the processor device a value type from the library of value types based on the predetermined required access code value type;
selecting locally by the processor device one of the plurality of sets corresponding to the selected value type;

before a first user input to the input device and subsequent to each user input to the input device:
  a) randomizing locally by the processor device the plurality of values contained in the selected set such that each of the pre-determined plurality of positions is randomly associated with one of the randomized plurality of values;
  b) randomizing locally by the processor device a configuration of the pre-determined plurality of positions on the input device to display either one of the randomized values or to display nothing;
  c) displaying, at each of the randomized positions, one of the randomized plurality of values or nothing; and
  d) accepting, via the input device, the user's input; and
allowing entry into the controlled device if the inputted sequence of values is the same as the predetermined required access code.

4. The method of claim 3, wherein the controlled device is one of an automobile door, garage door, residential door, office door, classified area entrance, computer system, and automatic teller machine.

5. The method of claim 3, wherein said input device comprises a touch screen.

6. The method of claim 3, wherein the input device comprises a plurality of solid state switches or capacitive devices.

7. The method of claim 3, wherein the plurality of values comprise numbers, letters, colors, words, or symbols.

8. The system of claim 1, wherein the processor is capable of receiving input from the input device and comparing the input with the locally stored predetermined required access code to determine if access to the controlled device should be granted.

9. The method of claim 3, wherein after accepting an initial value in the sequence of values, the steps of randomizing the plurality of values such that each of the positions is randomly associated with one of the randomized plurality of values, randomizing a configuration of the plurality of positions on the input device, and displaying, at each of the randomized positions, one of the randomized plurality of values, are repeated prior to accepting each subsequent value in the sequence of values.

10. The system of claim 1, wherein the predetermined access code is a sequence of numbers, and the set of values comprises a plurality of numbers including at least numbers making up the sequence of numbers.

11. The system of claim 1, wherein the predetermined required access code is a sequence of symbols, and the set of values comprises a plurality of symbols including at least the symbols making up the sequence of symbols.

12. The system of claim 1, wherein the predetermined required access code is received from a remote source.

* * * * *